US011210718B1

(12) United States Patent
Engelbart et al.

(10) Patent No.: US 11,210,718 B1
(45) Date of Patent: Dec. 28, 2021

(54) DYNAMICALLY MODIFYING USER INTERFACES ACCORDING TO PREDICTED USER PREFERENCE

(71) Applicant: Amazon Technologies, Inc., Seattle, WA (US)

(72) Inventors: Jason Engelbart, Seattle, WA (US); Wesley Lauka, Seattle, WA (US); Yi-Chen Lin, Seattle, WA (US); Seth Yount, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 715 days.

(21) Appl. No.: 16/002,434

(22) Filed: Jun. 7, 2018

(51) Int. Cl.
*G06Q 30/06* (2012.01)
*G06F 16/248* (2019.01)
*G06F 16/9535* (2019.01)
*G06F 16/2457* (2019.01)

(52) U.S. Cl.
CPC ....... *G06Q 30/0625* (2013.01); *G06F 16/248* (2019.01); *G06F 16/24578* (2019.01); *G06F 16/9535* (2019.01); *G06Q 30/0617* (2013.01); *G06Q 30/0641* (2013.01)

(58) Field of Classification Search
CPC ................................. G06Q 30/06–08
See application file for complete search history.

(56) References Cited

U.S. PATENT DOCUMENTS 6,373,502 B1 * 4/2002 Nielsen ................. G06F 16/986
715/708
2011/0276432 A1 * 11/2011 Bolivar .............. G06Q 30/0623
705/26.61

\* cited by examiner

*Primary Examiner* — Ming Shui
(74) *Attorney, Agent, or Firm* — Thomas | Horstemeyer, LLP (57) ABSTRACT

Disclosed are various embodiments for generating customized user interfaces including offers for items available by multiple merchants in an electronic marketplace. A search of an item database is performed in response to receiving a search query. If an item is available from multiple merchants in an electronic marketplace, a user interface element including selectable components for a subset of the merchants is inserted in proximity to a presentation of the item in a user interface. Interactions with the user interface element can be used to predict a preferred merchant of the user.

20 Claims, 8 Drawing Sheets

FIG. 7

DYNAMICALLY MODIFYING USER INTERFACES ACCORDING TO PREDICTED USER PREFERENCE

BACKGROUND

An electronic marketplace may include listings of items offered for sale, lease, download, rent, etc., by many different sellers. Users may use the electronic marketplace to purchase, lease, download, rent, etc., items of interest. In some cases, multiple sellers may offer the same item.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to generating customized user interfaces including offers for items available from multiple offering parties in an electronic marketplace. Specifically, the customized user interfaces of the present disclosure can include a customized user interface element in proximity to a presentation of a given item offered by multiple offering parties in the electronic marketplace. The user interface element may include selectable components associated with multiple parties offering the given item. Interactions with one or more of the selectable components of the user interface element can be used to reinforce and/or modify predictions of an offering party preferred by a user as well as influence the display and results of presentations of additional items in any given shopping session.

Typically, when a user interacts with an electronic marketplace, the user may enter a search query in a user interface associated with the electronic marketplace. When the user enters the search query, an item database may be searched. Prior to being displayed, the search results can be selected and ranked according to a variety of factors, such as, for example, relevance, date, popularity, price, size, user profile characteristics (e.g., user purchase history, user query history, user browse history, user demographic data, etc.), client characteristics (e.g., client location, device type, browser type, etc.), a membership status, location, delivery speed, and/or other factors. Each search result listing may correspond to a single offer for any given item. This offer may include an item description, a price, a delivery speed, a purchase program, an offering party, and/or any other information.

In some cases, an item may be available from multiple offering parties. In such cases, the offer may not be limited to a particular offering party or the offer may include a specific offering party that may be preferred by the user. For example, if the user has previously purchased the item from a given offering party via the electronic marketplace, the offer may be specific to the given offering party based at least in part on the prior interaction. In another example, if a user has an open cart (e.g., items already added to a shopping cart, but not yet purchased) that includes other items offered by a given offering party, the offer may be specific to the given offering party based at least in part on the open cart status. In these cases, the item offer associated with the particular offering party may be displayed. However, in some cases, an assumption that the user would prefer the same offering party may be inaccurate for a given shopping experience.

Likewise, if the user has not previously purchased the item and/or a similar item, and there are other parties offering the same item, there may be inadequate information to accurately predict which offering party the user would prefer. For example, a user may have an affinity for Offering Party A when purchasing Item X offline. Since these purchases have been offline, there may not be adequate information to accurately predict that the user would choose Offering Party A over Offering Party B or Offering Party C. In such cases, the offer may remain generic and not specify a particular offering party.

In accordance to various embodiments of the present disclosure, a customized user interface is generated to include a presentation of an offer of an item as well as a user interface element (e.g., a ribbon, a popup box, a popover box, a panel, a dropdown list, a table, etc.) including a plurality of selectable components (e.g., a button, link, item image, infographic, etc.) associated with a plurality of parties offering the same item. The offering parties presented in the user interface element can be selected and ranked according to a variety of factors such as, for example, prior interaction history, price, available discounts, location, delivery options, membership status, open cart status, aggregate interaction history, a predicted offering party preference, and/or other factors.

When the user interacts with a particular component in the user interface element and/or the offer of the item, a predicted offering party preference by the user can be reinforced and/or modified according to the type of interactions. For example, assume that a user interface includes a search results listing where an offer of an item by a given offering party is presented. The given offering party may be a predicted preference based on a prior purchase. However, a selection by the user of another offering party in the user interface element may indicate that the predicted offering party was inaccurate. As such, the selection of the other offering party can be used in future predictions of a preferred offering party.

Additionally, the display and results of presentations of additional items in any given shopping session can be dynamically updated in real time according to the interactions with the user interface element. For example, if the user is purchasing multiple items in the electronic marketplace during a single shopping session (e.g., grocery shopping, related item shopping, etc.), offering party predictions can be updated in real time according to the interactions by the user with the presented offering parties and/or offers. By providing the user with selectable choices of available offering parties of a given item and dynamically updating the display and presentation of the offering parties during a shopping session, the amount of time a user spends searching for a desired item and/or offering party can be reduced.

Moreover, the user interface element allows a user to access and/or modify data (e.g., item detail page including the offer associated with a particular offering party, add an item offered by a selected offering party to the shopping cart, etc.) associated with a specific offering by including additional information that would not necessarily be available. In some embodiments, client device display sizes may limit the amount of information that can be presented to the user. The inclusion of the user interface element in a size-limited results or other display page allows the user to be given control and choices regarding the different parties offering an item of interest in a simplified manner. For example, the user is not burdened by the extra time that may be required to scroll through multiple screens of options for selecting an offering party. In this case, the speed of a user's navigation through the network content of interest (e.g., search results, shopping cart, item detail page, etc.) is reduced by being provided with selected data of interest for the user.

Furthermore, the overall system can be improved by limiting the amount of network resources (e.g., bandwidth, processor usage, memory, etc.) that may be required for multiple searches by the user and/or review of multiple pages to identify the desired offering party for a particular item. By providing the user with selected information of interest that can be dynamically updated during a given shopping session or during future interactions, the efficiency of use of the client device and overall system is improved.

Figure 1:
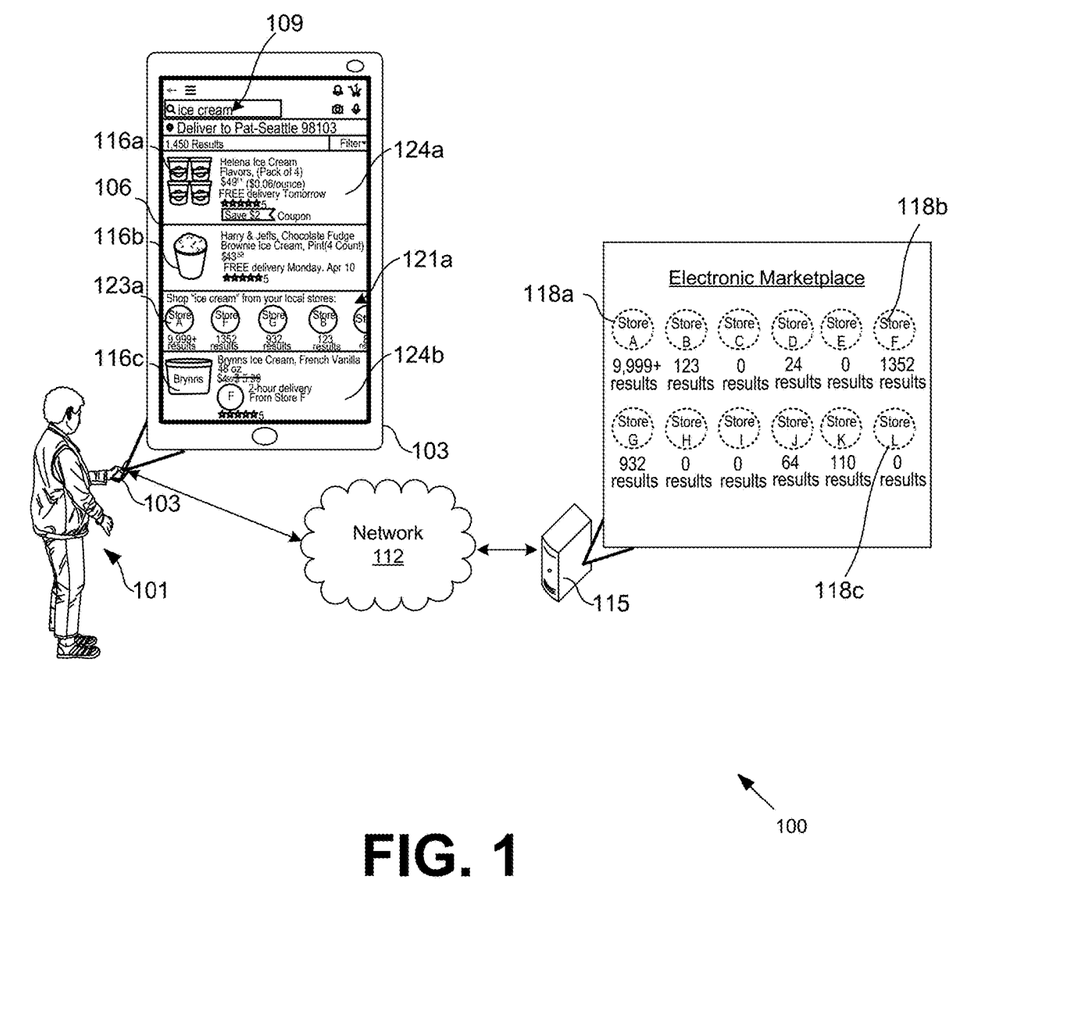
FIG. 1 is a drawing of an example scenario involving a user interacting, via a client, with an electronic marketplace having items available from multiple offering parties according to various embodiments of the present disclosure.

Turning now to FIG. 1, shown is drawing of an example scenario 100 where a user 101 is interacting with an electronic marketplace according to an embodiment of the present disclosure. As shown, the user 101 is interacting with a user interface 106 rendered on a client 103 which is in data communication with at least one computing device 115 via a network 112. A search query 109 (i.e., "ice cream") is entered by the user 101, and an electronic item database 218 (FIG. 2) is searched to determine items 116 (e.g., 116a, 116b, 116c) that match the search query 109. The user interface 106 presents a search result listing that includes a plurality of item search results 124 (e.g., 124a, 124b). In the context of FIG. 1, multiple offering parties 118 (e.g., 118a, 118b, 118c) in the electronic marketplace offer items relevant to the search query 109.

Since there are multiple offering parties 118 in the electronic marketplace that sell ice cream, the user interface 106 further includes a user interface element 121a inserted above search result 124b. In this example, the user interface element 121a comprises a ribbon that includes a plurality of selectable components 123 (e.g., 123a) that correspond to a particular offering party 118 offering the item 116 (i.e., "ice cream"). According to various embodiments, individual selectable components 123 are positioned and ordered according to a prediction of a user preference for a particular offering party 118. For example, selectable component 123a may be positioned first in the user interface element 121a based in part on being the top-ranked offering party of a ranking indicating which offering party 118 the user 101 would likely prefer for purchasing the item.

The offering party prediction can be based on a variety of factors, including, but not limited to, user interaction history, offer price, available discounts, minimum and/or maximum purchase threshold, membership requirements, delivery speed, offering party location, user location, capacity capabilities (e.g., available drivers, ability to complete an order, etc.), inventory, whether the offering party is associated with an open cart, aggregate user interaction history (e.g. how many other similar users selected this offering party for the purchase of a similar item, etc.), an environmental condition (e.g., traffic between offering party and user, weather status that may affect a delivery, etc.), and/or other factors.

In FIG. 1, the search result 124b illustrates a presentation of Brynns Ice Cream sold by Store F. However, the user interface element 121a provides the user with additional offering parties 118 not listed in the search results that also sell ice cream. As such, the user 101 may prefer to purchase ice cream from Store A instead of Store F and may select the selectable component 123a to learn more about the ice cream sold from Store A.

By understanding the offering parties 118 that the user 101 may prefer for any given item 116 and/or shopping experience, the complexity and constant tradeoff that a user 101 may face when dealing with multiple stores to choose from can be limited. Further, the actions of a user 101 detected by an interaction with the user interface 106 may be different than the originally predicted actions. These types of signals can be used to bolster and/or lessen the significance of a particular offering party for the user 101.

Additionally, the display and results of presentations of additional items in any given shopping session can be dynamically updated in real time according to the interactions with the user interface element 121. For example, if the user is purchasing multiple items 116 in the electronic marketplace during a single shopping session (e.g., grocery shopping, related item shopping, etc.), offering party predictions can be updated in real time based on the interactions by the user with the presented offering parties and/or offers. In the following discussion, a general description of the system and its components is provided, followed by a discussion of the operation of the same.

Figure 2:
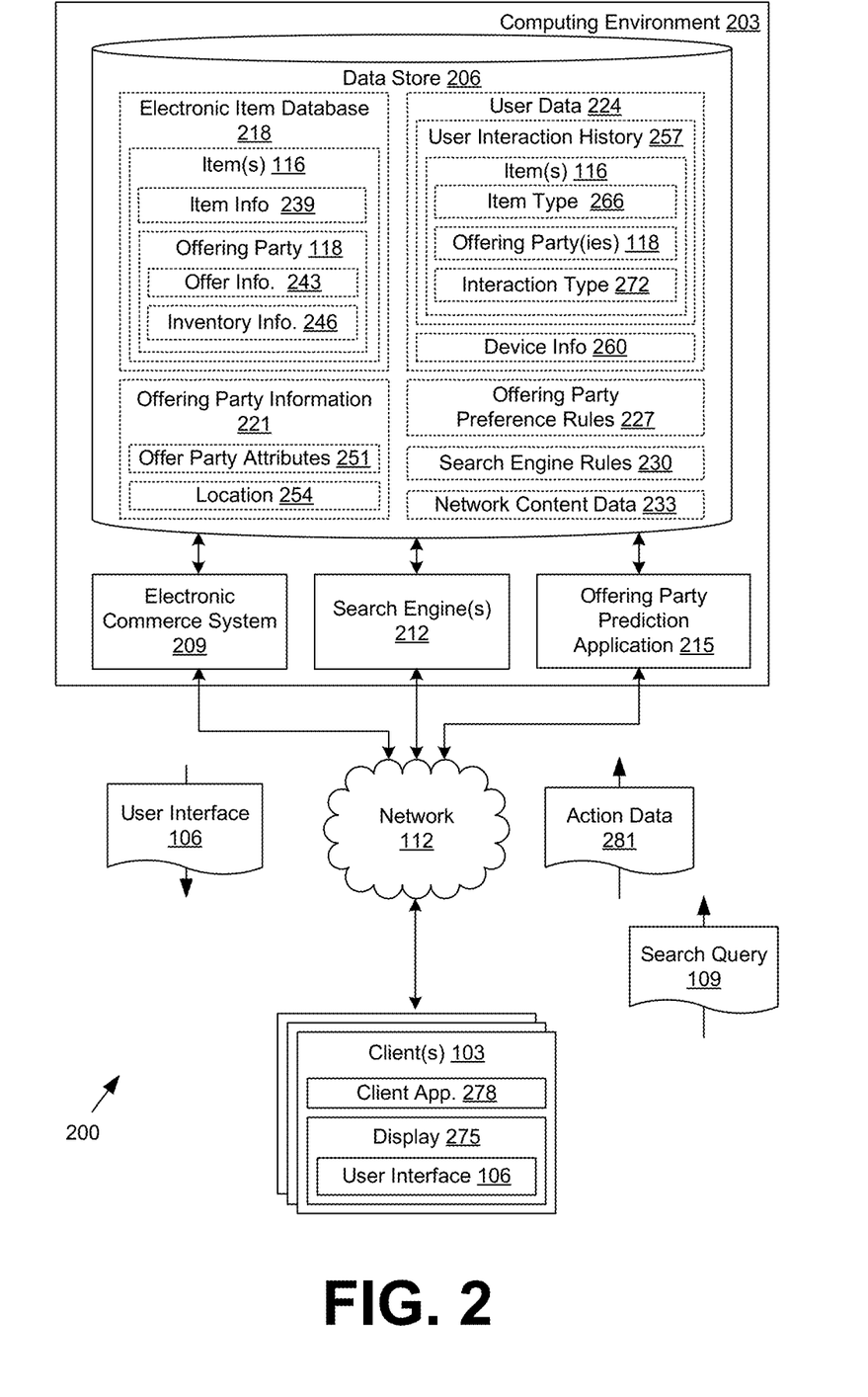
FIG. 2 is a schematic block diagram of a networked environment according to various embodiments of the present disclosure.

With reference to FIG. 2, shown is a networked environment 200 according to various embodiments. The networked environment 200 includes a computing environment 203 and one or more clients 103, which are in data communication with each other via a network 112. The network 112 includes, for example, the Internet, intranets, extranets, wide area networks (WANs), local area networks (LANs), wired networks, wireless networks, cable networks, satellite networks, or other suitable networks, etc., or any combination of two or more such networks.

The computing environment 203 may comprise, for example, a server computer or any other system providing computing capability. Alternatively, the computing environment 203 may employ a plurality of computing devices 115 that may be arranged, for example, in one or more server banks or computer banks or other arrangements. Such computing devices 115 may be located in a single installation or may be distributed among many different geographical locations. For example, the computing environment 203 may include a plurality of computing devices that together may comprise a hosted computing resource, a grid computing resource, and/or any other distributed computing arrangement. In some cases, the computing environment 203 may correspond to an elastic computing resource where the allotted capacity of processing, network, storage, or other computing-related resources may vary over time.

Various applications and/or other functionality may be executed in the computing environment 203 according to various embodiments. Also, various data is stored in a data store 206 that is accessible to the computing environment 203. The data store 206 may be representative of a plurality of data stores 206 as can be appreciated. The data stored in the data store 206 for example, is associated with the operation of the various applications and/or functional entities described below.

The components executed on the computing environment 203, for example, include an electronic commerce system 209, a search engine 212, an offering party prediction application 215, and other applications, services, processes, systems, engines, or functionality not discussed in detail herein. The electronic commerce system 209 is executed to facilitate the merchandising and purchase, rental, lease, download, and/or other form of consumption of items 116 over the network 112. The items 116 may include for example, products, goods, services, digital downloads, gift cards, and/or other items that may be purchased in an electronic marketplace. The electronic marketplace may include listings of items 116 offered for sale by many different merchants. The electronic marketplace may be operated by a proprietor who may also be a merchant.

The electronic commerce system 209 also performs various backend functions associated with the online presence of a merchant in order to facilitate the online purchase of items. For example, the electronic commerce system 209 may generate network content such as web pages, mobile application data, or other forms of content that are provided to clients 103 for the purpose of selecting items for purchase, rental, download, lease, or other forms of consumption. According to various embodiments, the electronic commerce system 209 can generate the user interface element 121 associated with an offering party preference and insert the user interface element 121 into the network content generated by the electronic commerce system 209 as can be appreciated.

The search engine 212 is executed to perform a search upon an item database using a search query 109 (FIG. 1) and return a set of search results 124 (FIG. 1). The search results 124 may be ranked according to relevance, date, popularity, price, size, and/or other factors. The search engine 212 may also select the search results 124 based at least in part on user profile characteristics (e.g., user purchase history, user query history, user browse history, user demographic data, etc.), client characteristics (e.g., client location, device type, browser type, etc.), and/or other data. Non-limiting examples of searches that may be performed via the search engine 212 may include product searches, service searches, image searches, music searches, video searches, a data search within a hosted computing resource, and/or other searches.

The offering party prediction application 215 is executed to predict an offering party preference by a user for a given item 116. According to various embodiments, the offering party prediction application 215 may evaluate a variety of factors to predict a preferred offering party 118 for a particular item 116. The factors may include, for example, prior interaction history, price, available discounts, location, delivery speed, delivery options, membership status, open cart status, aggregate interaction history, a predicted offering party preference, and/or other factors.

In some embodiments, the offering party prediction application 215 can generate the user interface element 121 associated with a predicted offering party preference and insert the user interface element 121 into the network content generated by the electronic commerce system 209 as can be appreciated. In other embodiments, the offering party prediction application 215 can provide the preferred offering party data to the electronic commerce system 209, and the electronic commerce system 209 can generate the user interface element 121 as can be appreciated.

The data stored in the data store 206 includes, for example, an electronic item database 218, offering party information 221, user profile data 224, offering party preference rules 227, search engine rules 230, network content data 233, and potentially other data. The electronic item database 218 includes information about a plurality of items 116 offered by one or more offering parties in an electronic marketplace. Each item 116 may be associated with item information 239, one or more offering parties 118, and/or other data. The item information 239 may include may include title, description, item type, weight, images, shipping classifications, user reviews, videos, and/or other information that may be used to describe an item 116.

An item 116 may be offered by one or more offering parties 118 in the electronic marketplace. Each offering party 118 of an item 116 may include offer information 243, inventory information 246, and/or other data. The offer information 243 may include information relating to a specific offering of the item 116 by a given offering party 118 in the electronic marketplace. The inventory information 246 can include an amount of inventory of the item 116 for the given offering party 118 in the electronic marketplace. The inventory information 246 can include locations (e.g., fulfillment centers, warehouses, stores, etc.) where inventory of the items 116 are currently stored. In some embodiments, the inventory information 246 can include inventory information for multiple locations associated with the given offering party 118.

The offering party information 221 includes information about a given offering party 118 that participates in the electronic marketplace. The offering party information 221 may be shared among some or all items 116 offered by the offering party 118. The offering party information 221 may include offering party attributes 251, a location 254, and/or other information. The offering party attributes 251 may include order threshold data (e.g., minimum orders, maximum orders, etc.), membership information, discount information, delivery speed, capacity information (e.g., available drivers, ability to complete an order, etc.), and/or other data. The location 254 may be the offering party's place of business, fulfillment location, and/or other locations. In some cases, an offering party 118 may be associated with multiple locations 254.

The user data 224 includes profile data relating to a user 101 and/or clients 103 associated with the user 101. The user data 224 can include user interaction history 257, device information 260, and/or any other type of user profile data as can be appreciated. The user interaction history 257 includes user historical data that can processed to identify user preferences in regard to specific items 116 and offering parties 118. The user interaction history 257 can include interaction history associated with one or more items 116 offered by one or more offering parties 118 in an electronic marketplace.

For each item 116, the user interaction history 257 can include item type 266, offering party 118, interaction type 272, and/or any other information as can be appreciated. According to various embodiments, the item type 266 can indicate characteristics about an item 116 associated with prior interactions of the particular user in the electronic marketplace. For example, the item type 266 can indicate multiple characteristics about the item 116 including, but not limited to, brand, color, governmental grade standards, organic status, nutritional quality, and/or any other type of characteristic that can define a particular item 116.

In one non-limiting example, assume that a user 101 has previously purchased organic apples in prior interactions with the electronic marketplace. In this example, the item 116 is the apple and the item type 266 indicates that the apple is organic. Based on this information, it can be assumed that organic items 116 may be available from the offering party 118 and that the purchase of the apple from the offering party 118 may indicate a signal that the user 101 may prefer to purchase organic items 116 from the given offering party 118.

The interaction type 272 can indicate the type of interaction associated with the particular item 116 offered in the electronic marketplace. For each item 116, the user interaction history 257 may include a purchase history, a browsing history, a viewing history, and/or any other history. For example, interaction type 272 can indicate whether the interaction resulted in a purchase, a return, a browsing without conversion, a comparison with another item that was ultimately purchased, and/or any other type of interaction as can be appreciated. The device information 260 may include device support data, location data, and/or any other data associated with a client.

The offering party preference rules 227 includes rules and/or configuration data for the various ranking algorithms or approaches employed by the offering party prediction application 215 in predicting a preferred offering party 118 of an item 116 for a particular user 101. For example, the offering party preference rules 227 may indicate which factors are to be considered in generating relevance rankings, and constants used in blending or weighting the factors.

The search engine rules 230 include rules and/or configuration data for the various ranking algorithms or approaches employed by the search engine 212 in searching the item database based in part on a search query 109 received from the client 103. For example, the search engine rules 230 may indicate which factors are to be considered in generating relevance rankings, and constants used in blending or weighting the factors.

The network content data 233 may include various data employed in generating customized user interfaces 106 and/or other network pages. The network content data 233 may include hypertext markup language (HTML), extensible markup language (XML), cascading style sheets (CSS), images, text, audio, video, templates, and/or other data.

The client 103 is representative of a plurality of client devices that may be coupled to the network 112. The client 103 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, smartwatches, head mounted displays, voice interface devices, or other devices. The client 103 may include a display 275. The display 275 may comprise, for example, one or more devices such as liquid crystal display (LCD) displays, gas plasma-based flat panel displays, organic light emitting diode (OLED) displays, electrophoretic ink (E ink) displays, LCD projectors, or other types of display devices, etc.

The client 103 may be configured to execute various applications such as a client application 278 and/or other applications. The client application 278 may be executed in a client 103, for example, to access network content served up by the computing environment 203 and/or other servers, thereby rendering a user interface 106 on the display 275. To this end, the client application 278 may comprise, for example, a browser, a dedicated application, etc., and the user interface 106 may comprise a network page, an application screen, etc. The client 103 may be configured to execute applications beyond the client application 278 such as, for example, email applications, social networking applications, word processors, spreadsheets, and/or other applications.

In some embodiments, the client application 278 may be configured to recognize interactions with a user interface element 121 of the user interface 106 and transmit action data 281 associated with the user interface element 121 and/or other features of the user interface 106 to the computing environment 203. The action data 281 may comprise, for example, selecting a selectable component 123 associated with a particular offering party 118 from the user interface element 121, hovering over a particular selectable component 123 for a predefined amount of time, selecting a selectable component 123 associated with particular offering party 118 from the user interface element 121 and then returning to the user interface 106 without converting, adding the item 116 offered by a given offering party 118 to a shopping cart, initiating an order or purchase of the item 116 from a given offering party 118, viewing an item detail page with more information about the item 116, closing the user interface 106, and/or other actions.

Figure 3A:
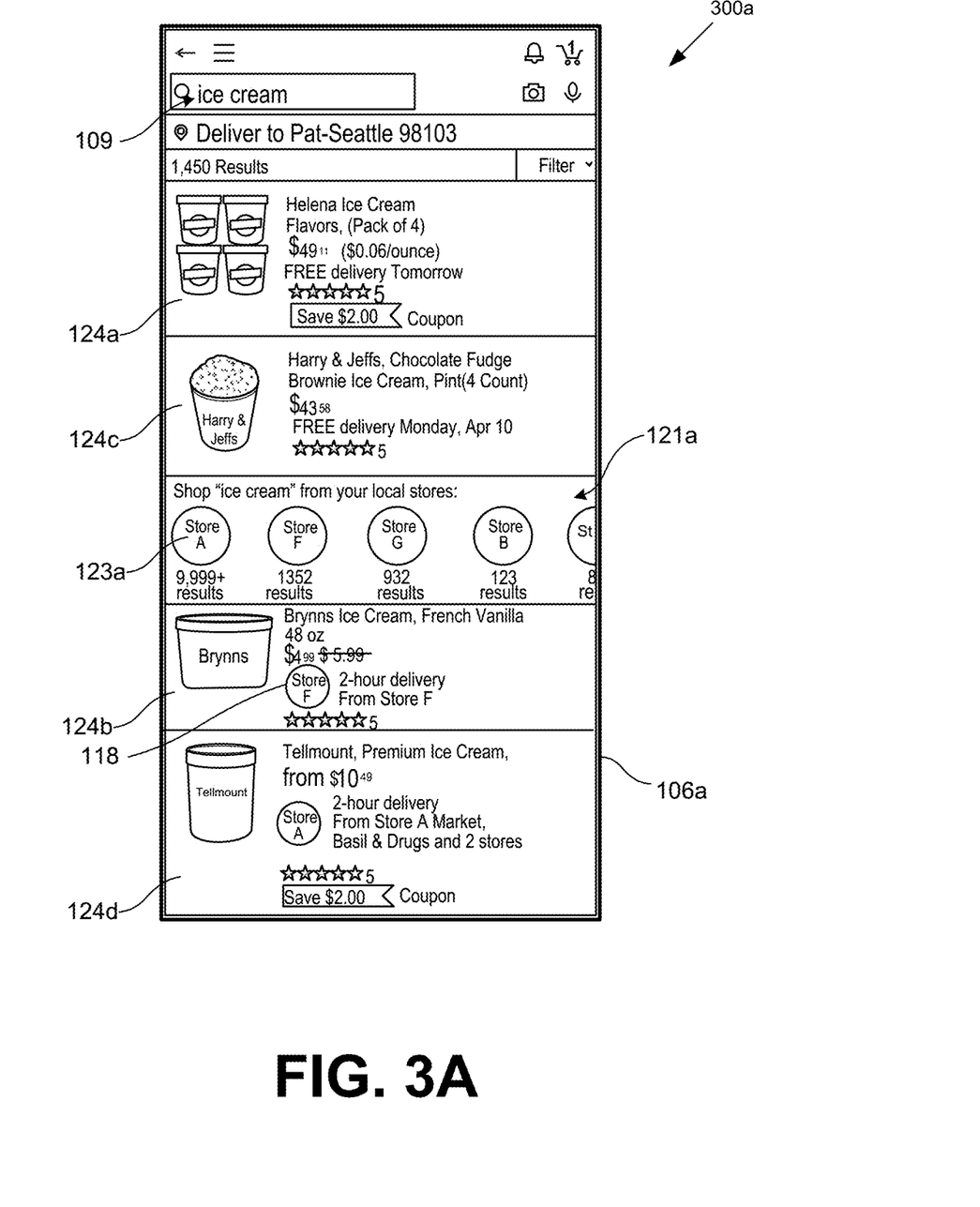
FIGS. 3A-3C are pictorial diagrams of example user interfaces rendered by a client in the networked environment of FIG. 2 according to various embodiments of the present disclosure.

Referring next to FIG. 3A, shown is a drawing of an example of a user interface 106a rendered by the client 103 (FIG. 1) in the networked environment 200 according to various embodiments of the present disclosure. In particular, FIG. 3A depicts an example of a search results page 300a rendered by the client application 278. Specifically, the search results page 300a shows search results 124 (e.g., 124a, 124b, 124c, 124d) returned following the receipt of a search query 109 for "ice cream." The search results 124 may be ordered based in part on a relevancy ranking. Each search result 124 provides an offer for a particular item 116 identified in the search. While some search results 124 (i.e., 124a, 124c) do not identify a particular offering party 118, other search results (i.e., 124b, 124d) may identify one or more stores that offer the item 116.

Since there are multiple offering parties 118 in the electronic marketplace that sell ice cream, the search results page 300a further includes a user interface element 121a inserted in between two search results 124. The user interface element 121a comprises a ribbon that includes a plurality of selectable components 123 (e.g., 123a) that correspond to a particular offering party 118 offering the item 116 (i.e., "ice cream"). Individual selectable components are positioned and ordered based on a prediction of a user preference for a particular offering party 118. For example, selectable component 123a may be positioned first in the user interface element 121a based on being the top-ranked offering party of a ranking indicating which offering party 118 the user 101 would likely prefer to purchase from.

The user interface element 121a can also include additional information about each offering party to provide additional decision making information to the user. For example, in FIG. 3A, a density of search results is provided for each offering party (e.g., 9,999+ results for Store A, 1352 results for Store B, etc.). Although the user interface element 121a of FIG. 3A shows density, the user interface element 121a can provide other information such as, for example, price, delivery speed, number of items to include to reach minimum purchase threshold, available offers, prior purchase history, an indication that the corresponding offering party has been predicted to be a preferred offering party, and/or other information.

Figure 3B:
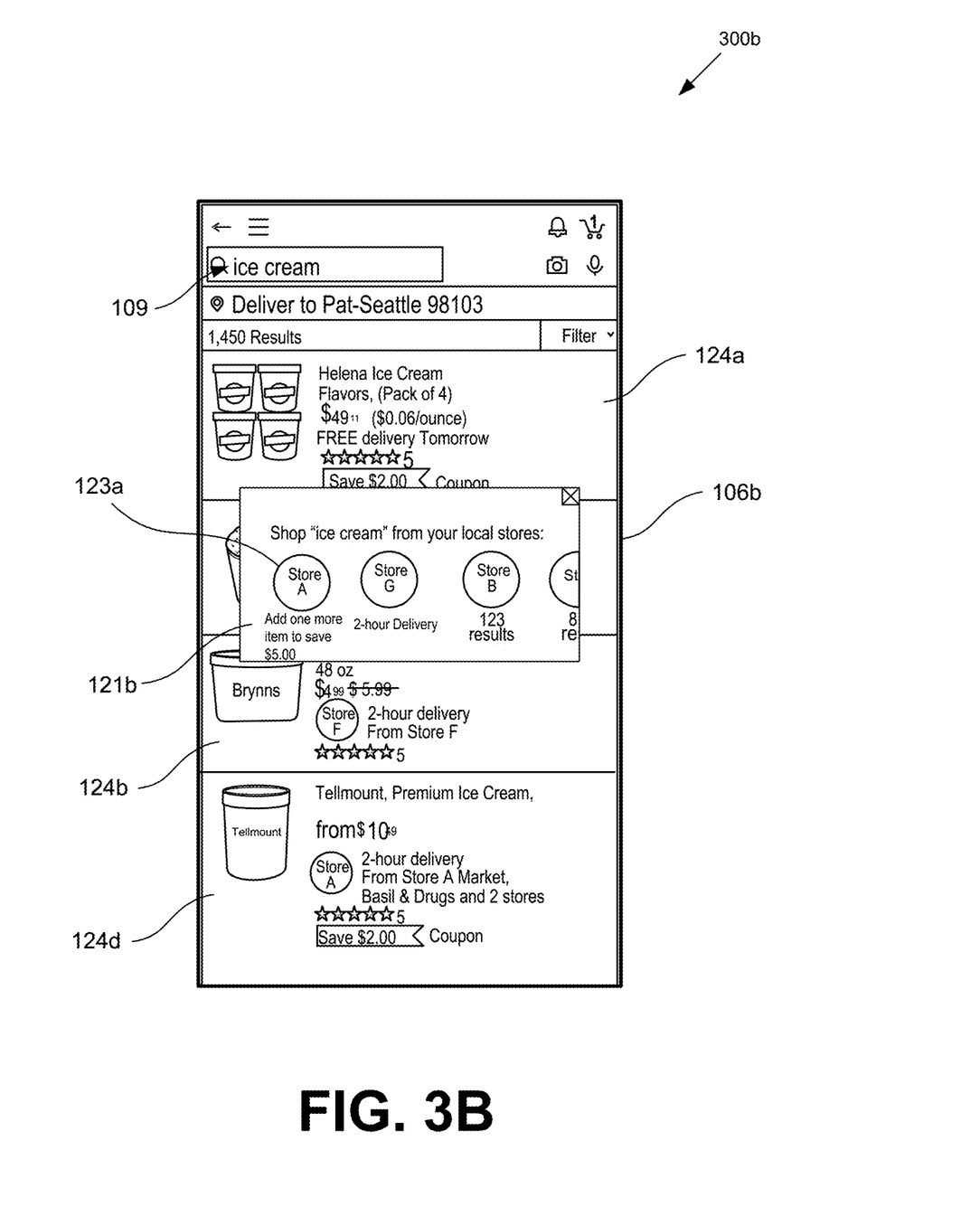

Turning now to FIG. 3B, shown is a drawing of an example of a user interface 106b rendered by the client 103 in the networked environment 200 according to various embodiments of the present disclosure. In particular, FIG. 3B depicts an example of a search results page 300b rendered by the client application 278. Like the search results page 300a of FIG. 3A, the search results page 300b of FIG. 3B shows search results 124 (e.g., 124a, 124c, 124d) returned following the receipt of a search query 109 for "ice cream." Each search result 124 provides an offer for a particular item 116 identified in the search. While some search results 124 (i.e., 124a, 124c) do not identify a particular offering party 118, other search results (i.e., 124d) may identify one or more stores that offer the item 116.

The search results page 300b differs from the search results page 300a of FIG. 3B in that the user interface element 121b comprises a popover box rather than a ribbon. Like the ribbon of FIG. 3B, the popover box includes a plurality of selectable components 123 (e.g., 123a) that correspond to a particular offering party 118 offering the item 116 (i.e., "ice cream"). Individual selectable components are positioned and ordered based on a prediction of a user preference for a particular offering party 118. For example, selectable component 123a may be positioned first in the user interface element 121a based on being the top-ranked offering party of a ranking to determine which offering party 118 the user 101 would likely prefer to purchase from.

Figure 3C:
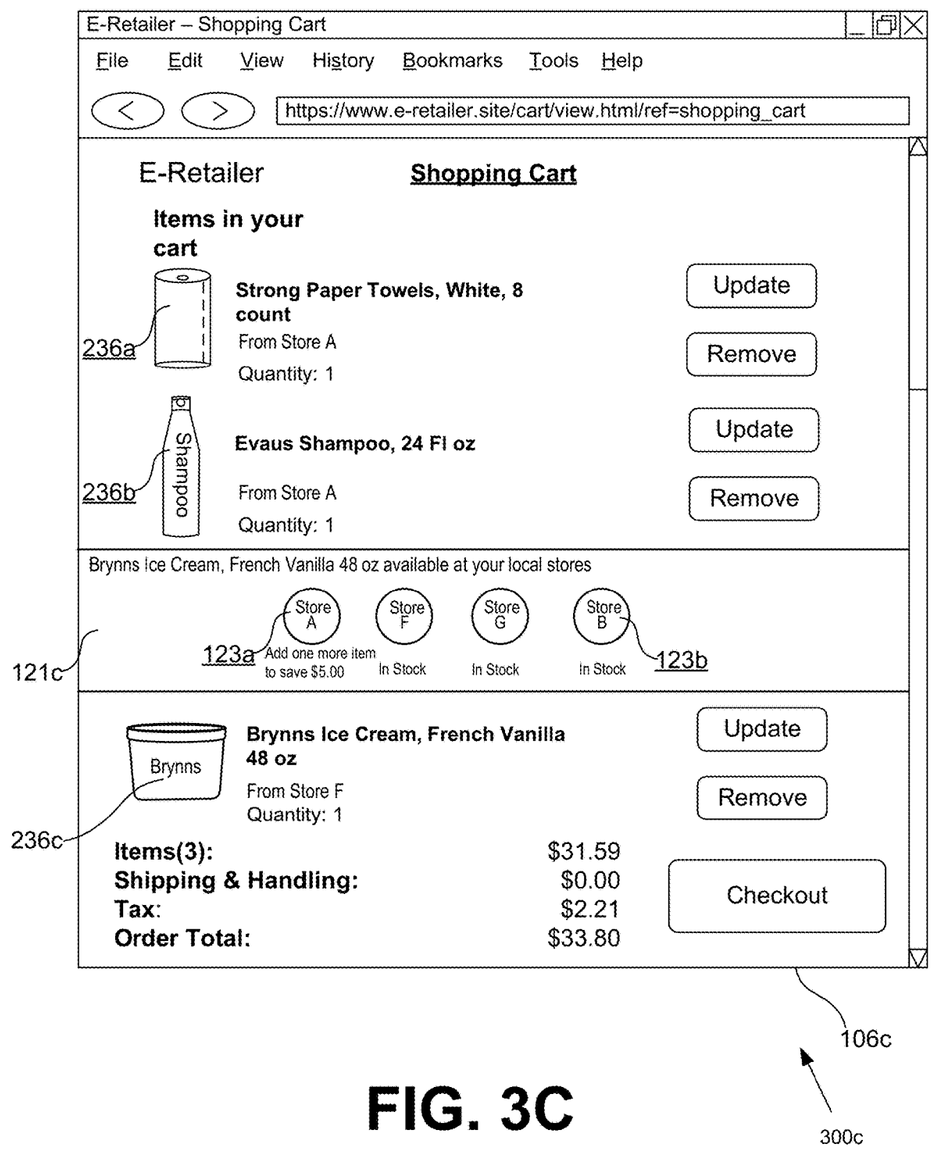

Moving on to FIG. 3C, shown is a drawing of an example of a user interface 106c rendered by the client 103 (FIG. 1) in the networked environment 200 according to various embodiments of the present disclosure. In particular, FIG. 3C depicts an example of a shopping cart page 300c rendered by the client application 278. Specifically, the shopping cart page 300c shows items 116 (e.g., 116a, 116b, 116c) added to the shopping cart by the user 101 (FIG. 1).

The shopping cart page 300c further includes a user interface element 121c inserted above the listing of item 116c for ice cream. As shown in FIG. 3C, the paper towels (e.g. 116a) and the shampoo (e.g., 116b) are offered by Store A, while the ice cream (e.g., 116c) is offered by Store F. The user interface element 121c comprises a ribbon that includes a plurality of selectable components 123 (e.g., 123a) that correspond to a particular offering party 118 offering the item 116a (i.e., "Brynns Ice Cream"). Individual selectable components are positioned and ordered according to a prediction of a user preference for a particular offering party 118. For example, selectable component 123a may be positioned first in the user interface element 121a based on being the top-ranked offering party of a ranking to determine which offering party 118 the user 101 would likely prefer to purchase from.

In this particular case, the user may prefer to purchase the item 116a from Store A rather than Store F because there is an incentive to purchase all items in the shopping cart from Store A. Proceeding to checkout without changing the offering party 118 from Store F to Store A provides a strong indication that the user's affinity for Store F outweighs the user's affinity for Store A. Likewise, selecting the selectable component 123a for Store A to change the offering party 118 from Store F to Store A provides an indication that the user does not have a strong preference for Store F over Store A. This information can be used in offering party predictions as well as the display and presentation of the offering parties 118 during a current and/or future shopping session.

Although the user interface elements 121 (e.g., 121a, 121b, 121c) of FIGS. 3A-3C illustrate a ribbon element or a popover element, the user interface elements 121 can comprise a ribbon, a popup box, a popover box, a panel, a dropdown list, a table, and/or other user interface elements as can be appreciated.

Figure 4:
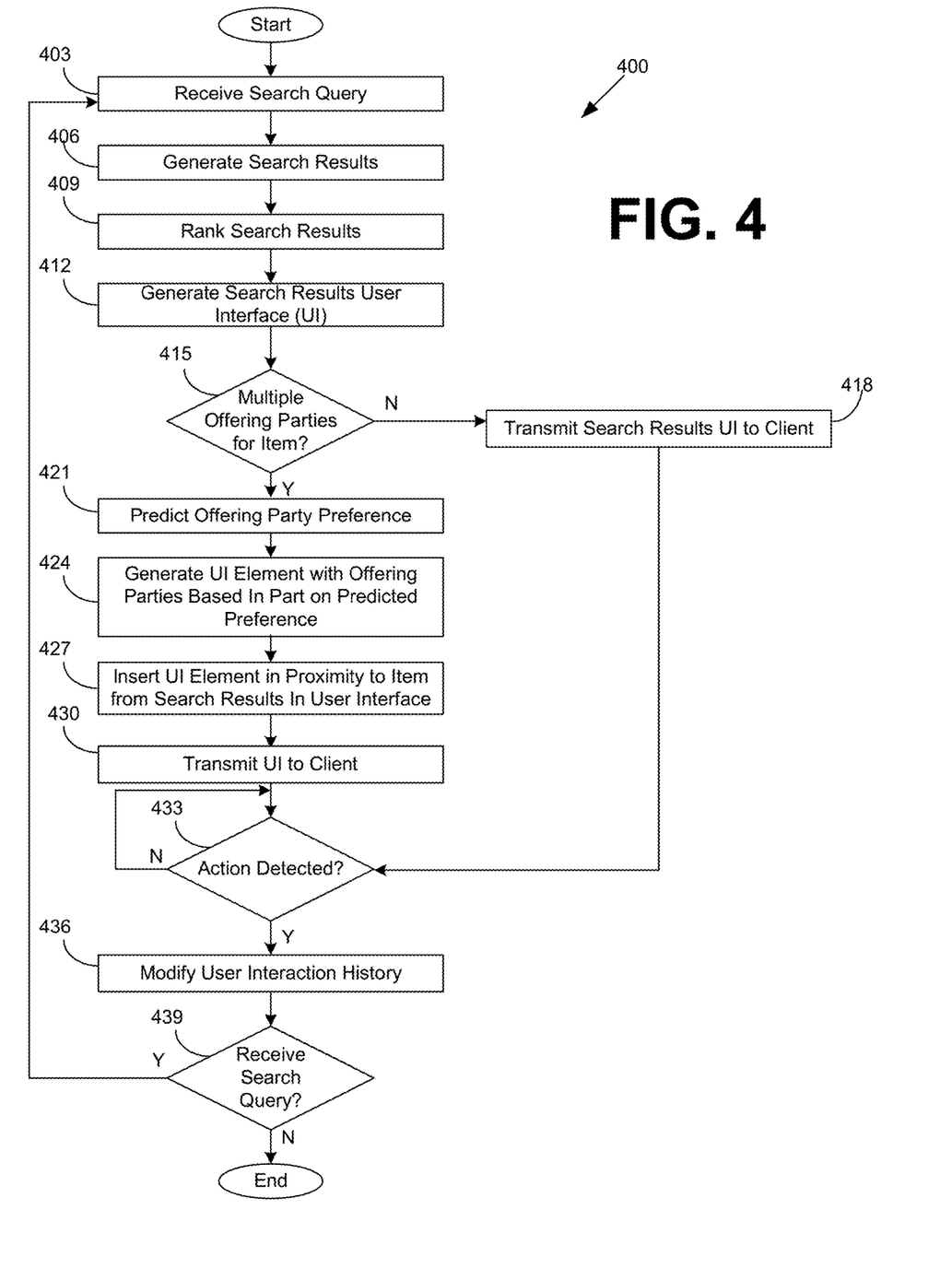
FIG. 4 is a flowchart illustrating one example of functionality implemented as portions of an electronic commerce application, a search engine, and an offering party prediction application executed in a computing environment in the networked environment of FIG. 2 according to various embodiments of the present disclosure.

Referring next to FIG. 4, shown is a flowchart 400 that provides one example of the operation of portions of the electronic commerce system 209, search engine 212, and offering party prediction application 215 according to various embodiments. It is understood that the flowchart of FIG. 4 provides merely an example of the many different types of functional arrangements that may be employed to implement the operation of the portions of the electronic commerce system 209, search engine 212, and offering party prediction application 215 as described herein. As an alternative, the flowchart of FIG. 4 may be viewed as depicting an example of elements of a method implemented in the computing environment 203 (FIG. 2) according to one or more embodiments.

Beginning with box 403, the electronic commerce application 209 receives a search query 109 (FIG. 1) entered into a user interface 106 (FIG. 1) rendered by a client 103 (FIG. 1). The search query 109 can correspond to an item available for sale, lease, download, rent, etc., in an electronic marketplace. At box 406, the electronic commerce application 209 can direct the search engine 212 to generate the search results 124 by searching an item database 218 (FIG. 2) of items 116 (FIG. 1) available via the electronic marketplace. According to various embodiments, the item database 218 may be searched in accordance with the search engine rules 230 (FIG. 2). Each search result 124 may correspond to a single offer for any given item 116.

At box 409, the electronic commerce application 209 ranks the generated search results 124 according to one or more factors, such as, for example, relevance, date, popularity, price, size, user profile characteristics (e.g., user purchase history, user query history, user browse history, user demographic data, etc.), client characteristics (e.g., client location, device type, browser type, etc.), a membership status, location, delivery speed, and/or other factors. For example, a respective weight may be applied to one or more of the factors for each returned search result 124. A sum of the weights may be calculated, and each search result 124 may be ranked according to the sum of the weights. In some embodiments, only a highest-ranked subset of search results 124 may be selected to be presented to a user 101 via a user interface 106 rendered on a client 103. The number of search results 124 to include in user interface 106 can be based at least in part on a client-supported display size, a predefined threshold, and/or any other factor.

At box 412, the electronic commerce application 209 generates a search results user interface 106 including the selected search results 124. At box 415, the electronic commerce system 209 may determine if there are multiple offering parties 118 associated with a particular item 116 in the selected search results 124. If there are no items 116 identified in the search results 124 that are associated with multiple offering parties 118, the electronic commerce application 209 proceeds to box 418. At box 418, the electronic commerce application 209 transmits the generated search results user interface 106 to the client 103. Once the search results user interface 106 is transmitted to the client 103, the electronic commerce application 209 proceeds to box 433 to determine whether an action has been detected.

Figure 5:
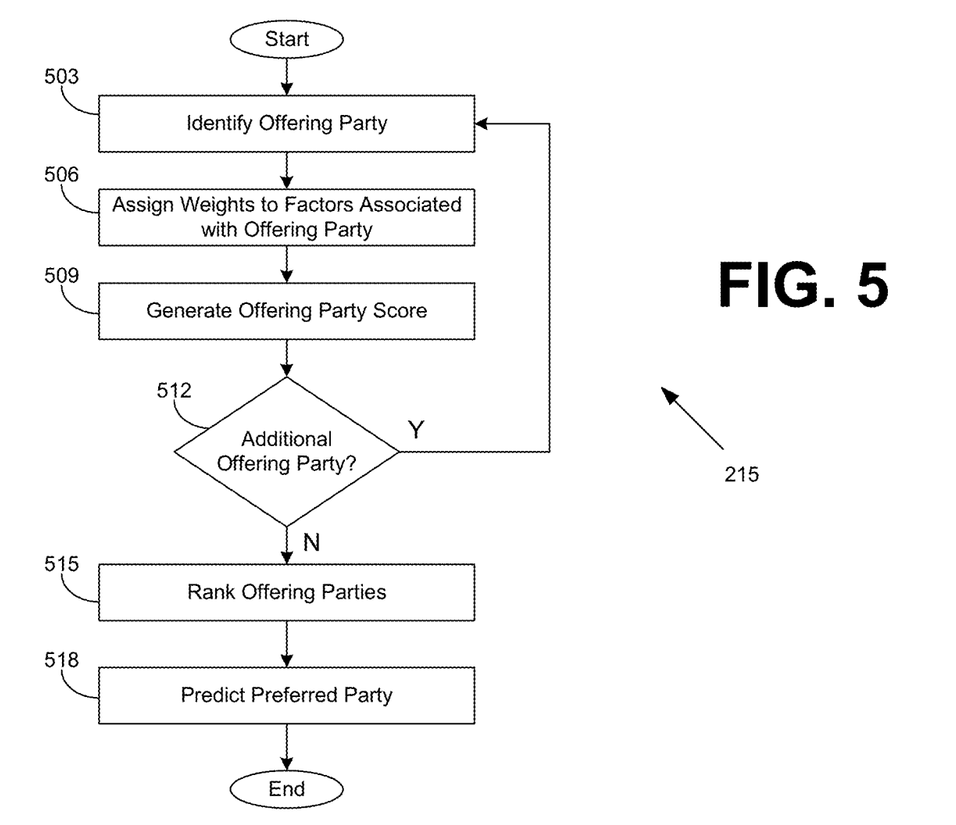
FIG. 5 is a flowchart illustrating one example of functionality implemented as portions of the offering party prediction application executed in a computing environment in the networked environment of FIG. 2 according to various embodiments of the present disclosure.

If an item 116 is identified in the search results 124 as having multiple offering parties 118, the electronic commerce system 209 proceeds to box 421. At box 421, the offering party prediction application 215 predicts a preferred offering party of the given item 116 for the user 101. For example, various ranking algorithms or approaches defined by the offering party preference rules 227 can be employed by the offering party prediction application 215 in predicting a preferred offering party 118 of an item 116 for a particular user 101. FIG. 5 provides one example of how a preferred offering party can be predicted.

According to various embodiments, an offering party preference can be predicted using a variety of factors including, but not limited to, user interaction history 257, offer price, available discounts, minimum and/or maximum purchase threshold, membership requirements, delivery timeframe, offering party location, user location, capacity capabilities (e.g., available drivers, ability to complete an order, etc.), inventory, whether the offering party is associated with an open cart, aggregate user interaction history (e.g. how many other similar users selected this offering party for the purchase of a similar item, etc.), an environmental condition (e.g., traffic between offering party and user, weather status that may affect a deliver, etc.), and/or other factors.

At box 424, the electronic commerce system 209 generates a user interface element 121 to include an identification of offering parties 118 offering the item 116 via the electronic marketplace. The user interface element 121 can comprise a ribbon, a popup box, a popover box, a dialog box, a collapsible panel, a dropdown list, and/or other user interface element as can be appreciated. The user interface element 121 is generated to include a plurality of selectable components 12 corresponding to a plurality of offering parties 118 offering the item 116 via the electronic marketplace. In some embodiments, the positioning and/or ordering of individual selectable components 123 can be based at least in part on a ranking of the offering parties 118. For example, the first selectable component 123a (FIG. 1) presented in the user interface element 121 can comprise the predicted preferred offering party 118a.

At box 427, the generated user interface element 121 is inserted in proximity to a presentation of the item 116 in the search results user interface 106. For example, the user interface element 121 can be inserted above, below, over, or adjacent to the presentation of the item 116. In some embodiments, the user interface element 121 can be inserted such that a hovering over the presentation of the item causes the user interface element 121 to be displayed. For example, as shown in FIG. 3B, the user interface element 121 can be a popover window and can be displayed to request that a user 101 narrow down the offering parties 118 associated with a given item 116. In other embodiments, the user interface element 121 can be inserted as part of the presentation of the item 116. For example, the user interface element 121 can allow a user to swipe to the left or the right to view the different offering parties 118 associated with the given item 116.

At box 430, the customized user interface 106 including the inserted user interface element 121 is transmitted to the client 103. At box 433, the electronic commerce system 209 determines whether an action associated with user interface 106 has occurred. For example, when a user 101 interacts with the user interface 106, the client application 278 may transmit action data 281 indicating the type of action by the user 101 with the user interface 106 rendered on the client 103. The action data 281 can include, for example, selecting a selectable component 123 associated with a particular offering party 118 from the user interface element 121, hovering over a particular selectable component 123 for a predefined amount of time, selecting a selectable component 123 associated with a particular offering party 118 from the user interface element 121 and then returning to the user interface 106 without converting, adding the item 116 offered by a given offering party 118 to a shopping cart, initiating an order or purchase of the item 116 from a given offering party 118, viewing an item detail page with more information about the item 116, closing the user interface 106, and/or other actions.

If no action is detected, the electronic commerce system 209 continues to wait for an action to occur. However, if an action is detected, the electronic commerce system 209 proceeds to box 436, and the electronic commerce system 209 modifies the user interaction history 257 to reflect the new action associated with the customized user interface 106. At box 439, the electronic commerce system 209 determines if another search query 109 is received from the client 103. For example, the user 101 may be participating in a multi-interaction shopping session where the user may search for multiple items 116 during a single session (e.g., a grocery shopping session, a related items shopping session, etc.). As such, the user 101 may enter a new search query 109 for another item 116. In some embodiments, the electronic commerce system 209 can determine if a user 101 is participating in a multi-interaction shopping session based at least in part on a type of search query 109. For example, if the search query 109 is related to a type of food, the electronic commerce system 209 may determine that the user 101 is participating in a multi-interaction shopping session. Other factors that can be used to determine if the user 101 is participating in a multi-interaction shopping sessions can include prior interaction history, type of item, aggregate interaction history (e.g., actions of other users search for a similar and/or same item), open cart status, number items 116 added to shopping cart, and/or other factors. If a search query 109 is detected, the electronic commerce system 209 returns to box 406. Otherwise, the portion of the electronic commerce system 209 ends.

Referring next to FIG. 5, shown is a flowchart that provides one example of the operation of a portion of the offering party prediction application 215 according to various embodiments. It is understood that the flowchart of FIG. 5 provides merely an example of the many different types of functional arrangements that may be employed to implement the operation of the portion of the offering party prediction application 215 as described herein. As an alternative, the flowchart of FIG. 5 may be viewed as depicting an example of elements of a method implemented in the computing environment 203 (FIG. 2) according to one or more embodiments.

Beginning with box 503, the offering party prediction application 215 identifies an offering party 118 (FIG. 1) offering an item 116 (FIG. 1) identified in the search results 124 (FIG. 1). At box 506, the offering party prediction application 215 assigns weights to factors associated with the offering party. The factors can include user interaction history 257 (FIG. 2), offer price, available discounts, minimum and/or maximum purchase threshold, membership requirements, delivery timeframe, offering party location, user location, capacity capabilities (e.g., available drivers, ability to complete an order, etc.), inventory, whether the offering party is associated with an open cart, aggregate user interaction history (e.g. how many other similar users selected this offering party for the purchase of a similar item, etc.), an environmental condition (e.g., traffic between offering party and user, weather status that may affect a deliver, etc.), and/or other factors. The weights can be determined according to the offering party preference rules 227 (FIG. 2).

In some embodiments, the weights may differ according to the type of factor. For example, if a user 101 added an item 116 associated with Offering Party A 118a during the same shopping session, an open cart factor associated with the offering party 118 may be given a greater weight than if a user 101 hovered over a selectable component 123 of the offering party 118 presented with search results 124 of a prior search for another item 116 during the same shopping session, but ultimately selected another offering party 118.

At box 509, the offering party prediction application 215 generates an offering party score for the identified offering party 118. For example, the offering party prediction application 215 may sum the value of the weights assigned to the relevant factors for the offering party 118. At box 512, the offering party prediction application determines if there are additional offering parties 118 offering the given item 116. If there are additional offering parties, the offering party prediction application 215 returns to box 503. Otherwise, the offering party prediction application 215 proceeds to box 515 where the offering party prediction application 215 ranks the offering parties 118 according to their respective offering party score. At box 518, the offering party prediction application 215 predicts a preferred offering party for the user based on the highest ranked offering party 118. In some embodiments, the predicted preferred offering party 118 can be used as an offering party 118 associated with an item 116 in a search result listing 124. In other embodiments, the predicted preferred offering party 118 can be the first offering party 118 in an ordered arrangement of selectable components 123 included in a user interface element 121 that is positioned in proximity to the search result listing 124 of a given item 116. After predicting the preferred offering party, this portion of the offering party prediction application 215 ends.

Figure 6:
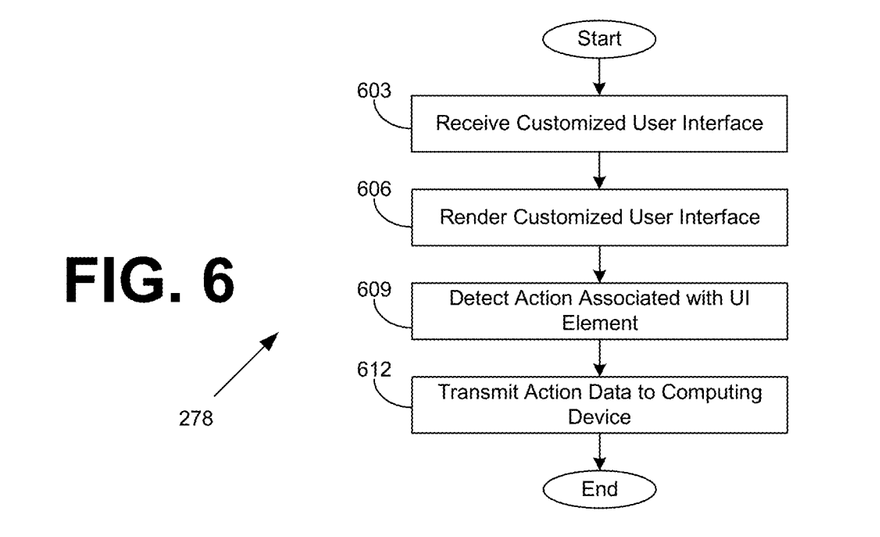
FIG. 6 is a flowchart illustrating one example of functionality implemented as portions of a client application executed in a client in the networked environment of FIG. 2 according to various embodiments of the present disclosure.

Referring next to FIG. 6, shown is a flowchart that provides one example of the operation of a portion of the client application 278 (FIG. 2) according to various embodiments. It is understood that the flowchart of FIG. 6 provides merely an example of the many different types of functional arrangements that may be employed to implement the operation of the portion of the client application 278 as described herein. As an alternative, the flowchart of FIG. 6 may be viewed as depicting an example of elements of a method implemented in the client 103 (FIG. 2) according to one or more embodiments.

Beginning with box 603, the client application 278 receives the customized user interface 106 from the electronic commerce application 209 over the network 112. At box, 606, the client application 278 renders the customized user interface 106 via a display 275 (FIG. 2) of the client 103. At box 609, the client application 278 detects an action associated with the user interface element 121 of the user interface 106. The action may comprise, for example, selecting a selectable component 123 associated with a particular offering party 118 from the user interface element 121, hovering over a particular selectable component 123 for a predefined amount of time, selecting a selectable component 123 associated with a particular offering party 118 from the user interface element 121 and then returning to the user interface 106 without converting, adding the item 116 offered by a given offering party 118 to a shopping cart, initiating an order or purchase of the item 116 from a given offering party 118, viewing an item detail page with more information about the item 116, closing the user interface 106, and/or other actions. At box 612, the client application 278, transmits action data 281 including the detection action to the electronic commerce application 209, and then this portion of the client application 278 ends.

Figure 7:
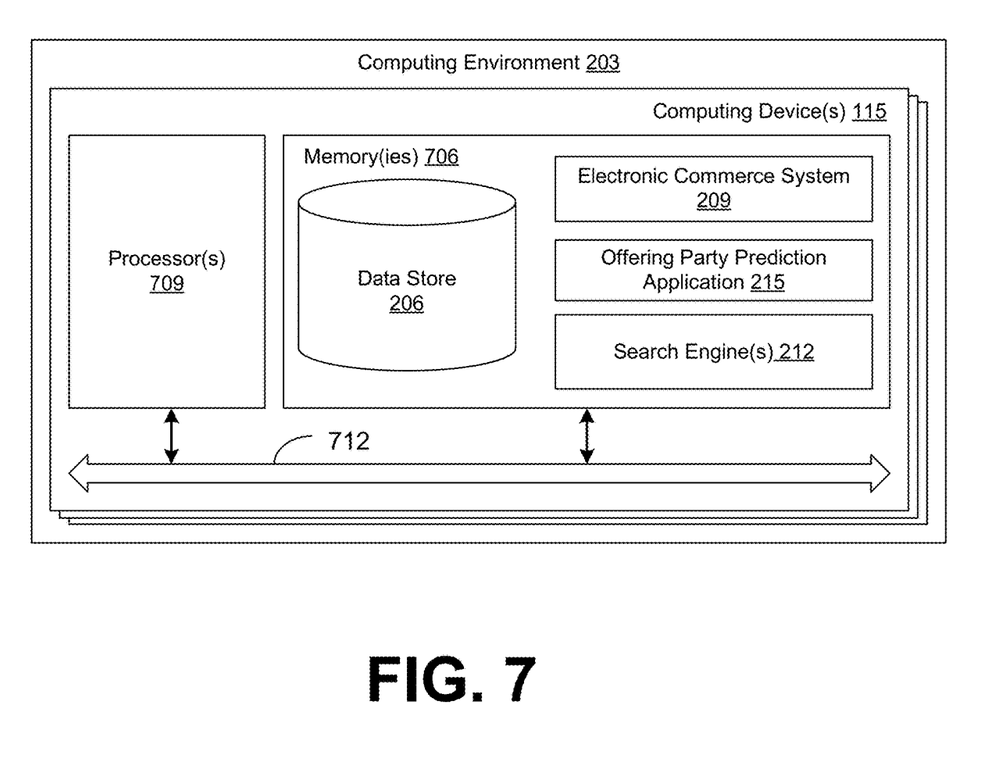
FIG. 7 is a schematic block diagram that provides one example illustration of a computing environment employed in the networked environment of FIG. 2 according to various embodiments of the present disclosure.

With reference to FIG. 7, shown is a schematic block diagram of the computing environment 203 according to an embodiment of the present disclosure. The computing environment 203 includes one or more computing devices 115. Each computing device 115 includes at least one processor circuit, for example, having a processor 709 and a memory 706, both of which are coupled to a local interface 712. To this end, each computing device 115 may comprise, for example, at least one server computer or like device. The local interface 712 may comprise, for example, a data bus with an accompanying address/control bus or other bus structure as can be appreciated.

Stored in the memory 706 are both data and several components that are executable by the processor 709. In particular, stored in the memory 706 and executable by the processor 709 are the electronic commerce system 209, the search engine 212, the offering party prediction application 215, and potentially other applications. Also stored in the memory 706 may be a data store 206 and other data. In addition, an operating system may be stored in the memory 706 and executable by the processor 709.

It is understood that there may be other applications that are stored in the memory 706 and are executable by the processor 709 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 706 and are executable by the processor 709. In this respect, the term "executable" means a program file that is in a form that can ultimately be run by the processor 709. Examples of executable programs may be, for example, a compiled program that can be translated into machine code in a format that can be loaded into a random access portion of the memory 706 and run by the processor 709, source code that may be expressed in proper format such as object code that is capable of being loaded into a random access portion of the memory 706 and executed by the processor 709, or source code that may be interpreted by another executable program to generate instructions in a random access portion of the memory 706 to be executed by the processor 709, etc. An executable program may be stored in any portion or component of the memory 706 including, for example, random access memory (RAM), read-only memory (ROM), hard drive, solid-state drive, USB flash drive, memory card, optical disc such as compact disc (CD)

or digital versatile disc (DVD), floppy disk, magnetic tape, or other memory components.

The memory 706 is defined herein as including both volatile and nonvolatile memory and data storage components. Volatile components are those that do not retain data values upon loss of power. Nonvolatile components are those that retain data upon a loss of power. Thus, the memory 706 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 709 may represent multiple processors 709 and/or multiple processor cores and the memory 706 may represent multiple memories 706 that operate in parallel processing circuits, respectively. In such a case, the local interface 712 may be an appropriate network that facilitates communication between any two of the multiple processors 709, between any processor 709 and any of the memories 706, or between any two of the memories 706, etc. The local interface 712 may comprise additional systems designed to coordinate this communication, including, for example, performing load balancing. The processor 709 may be of electrical or of some other available construction.

Although the electronic commerce system 209, the search engine 212, the offering party prediction application 215, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 4-6 show the functionality and operation of an implementation of portions of the electronic commerce system 209, the search engine 212, and/or the offering party prediction application 215. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 709 in a computer system or other system. The machine code may be converted from the source code, etc. If embodied in hardware, each block may represent a circuit or a number of interconnected circuits to implement the specified logical function(s).

Although the flowcharts of FIGS. 4-6 show a specific order of execution, it is understood that the order of execution may differ from that which is depicted. For example, the order of execution of two or more blocks may be scrambled relative to the order shown. Also, two or more blocks shown in succession in FIGS. 4-6 may be executed concurrently or with partial concurrence. Further, in some embodiments, one or more of the blocks shown in FIGS. 4-6 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the electronic commerce system 209, the search engine 212, and the offering party prediction application 215, that comprises software or code can be embodied in any non-transitory computer-readable medium for use by or in connection with an instruction execution system such as, for example, a processor 709 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the electronic commerce system 209, the search engine 212, and the offering party prediction application 215, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 115, or in multiple computing devices 115 in the same computing environment 203.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should Therefore, the following is claimed:

1. A non-transitory computer-readable medium embodying a program executable in at least one computing device, wherein when executed the program causes the at least one computing device to at least:

receive a search query from a client;

generate a plurality of search results based at least in part on the search query;

determine that the search query is associated with a shopping session with an electronic commerce marketplace, the shopping session comprising a plurality of searches for a plurality of different items available for purchase, download or lease via the electronic commerce marketplace;

determine that a first item in the plurality of search results is available from a plurality of offering parties in the electronic commerce marketplace;

rank the plurality of offering parties based at least in part on a prior interaction history;

generate a first user interface element comprising a plurality of selectable components comprising individual selectable components corresponding to a respective offering party of the first item of a highest-ranked set from the plurality of offering parties, an order of placement of the individual selectable components being based at least in part on a respective ranking of the respective offering party;

insert the first user interface element in proximity to a presentation of the first item in a search results user interface;

detect a first action within the shopping session, the first action being associated with the first user interface element in the search results user interface being rendered on the client, the first action corresponding to a selection of a particular selectable component of the plurality of selectable components, the particular selectable component being associated with a particular offering party of the highest-ranked set of the plurality of offering parties;

detect a second action within the shopping session that corresponds to a selection of a second item offered by the particular offering party;

determine that a third item within a shopping cart is available from the particular offering party and is currently being sold from a different offering party than the particular offering party;

re-rank the plurality of offering parties based upon the first action and second action; and generate a second user interface element with the re-ranked plurality of offering parties in proximity to a presentation of the third item on a shopping cart user interface, wherein the second user interface element operates to allow a user to modify a provider of the third item from the different offering party to the particular offering party or a third offering party and provide an incentive to modify the provider of the third item to the particular offering party.

2. The non-transitory computer-readable medium of claim 1, wherein the search query comprises a first search query, the plurality of search results comprises a first plurality of search results, the plurality of offering parties comprises a first plurality of offering parties, and when executed, the program further causes the at least one computing device to at least:

receive a second search query from the client;

determine that a fourth item within a second plurality of search results for the second search query is available from a second plurality of offering parties;

rank the second plurality of offering parties associated with the fourth item based at least in part on the prior interaction history; and generate another user interface element comprising a second plurality of selectable components, the second plurality of selectable components corresponding to a highest-ranked subset of the second plurality of offering parties.

3. The non-transitory computer-readable medium of claim 1, wherein when executed the program further causes the at least one computing device to at least generate a respective score for individual offering parties of the plurality of offering parties based at least in part on a sum of weights assigned to a plurality of factors, and the plurality of offering parties being ranked according to the respective score.

4. The non-transitory computer-readable medium of claim 3, wherein the plurality of factors comprise at least one of: a prior action with a prior user interface element, a user-specific purchase history, a similar user purchase history, a offering parties capacity, a membership status, an environmental condition, a delivery speed, a client location, an offering party location, an item price, an open cart status, or an item type.

5. A system, comprising:

at least one computing device; and at least one application executable in the at least one computing device, wherein when executed the at least one application causes the at least one computing device to at least:

determine that a first item is available from a plurality of merchants via an electronic commerce marketplace;

select a subset of merchants from the plurality of merchants based at least in part on a predicted merchant preference;

generate a first user interface element comprising a plurality of selectable components comprising individual selectable components corresponding to a respective merchant in the subset of merchants;

insert the first user interface element in a user interface associated with a presentation of the first item in the user interface;

transmit the user interface to a client device;

detect a first interaction performed by the client device, the first interaction being associated with the first user interface element within a shopping session, the first interaction corresponding to a selection of a particular selectable component of the plurality of selectable components, the particular selectable component being associated with a first merchant of the subset of merchants;

detect a second interaction performed by the client device within the shopping session, the second interaction corresponding to a selection of a second item offered by the first merchant;

determine that a third item within a shopping cart is available from the first merchant and is currently being sold from a second merchant that is different from the first merchant;

rank the plurality of merchants based upon the first interaction and second interaction; and generate a second user interface element with the ranked plurality of merchants in proximity to a presentation of the third item on a shopping cart user interface, wherein the second user interface element operates to allow a user to modify a provider of the third item from the second merchant to the first merchant or a third merchant and provide an incentive to modify the provider of the third item to the first merchant.

6. The system of claim 5, wherein, when executed, the at least one application further causes the at least one computing device to at least determine the predicted merchant preference of the user based at least in part on a plurality of factors comprising at least one of: a prior action with a prior user interface element, a user-specific purchase history, a similar user purchase history, a merchant capacity, a membership status, an environmental condition, a client location, a merchant location, a delivery speed, an item price, an open cart status, or an item type.

7. The system of claim 6, wherein selecting the subset of merchants from the plurality of merchants comprises:

assigning a respective weight to individual factors of the plurality of factors;

generating a respective score for individual merchants of the plurality of merchants; and ranking the individual merchants according to the respective score, the subset of merchants comprising a highest ranked set of the plurality of merchants.

8. The system of claim 5, wherein the first and the second interactions comprise at least one of a hovering over at least one of the plurality of selectable components for a predefined amount of time or a selection of the particular selectable component.

9. The system of claim 5, wherein the first item is included in search results for a received search query, the user interface comprising a search results user interface.

10. The system of claim 9, wherein the first item is one of a plurality of items selected for purchase via the client device, and the user interface comprises a shopping cart user interface.

11. The system of claim 5, wherein the first user interface element comprises a ribbon element, the ribbon element being inserted in proximity to the presentation of the first item in the user interface.

12. The system of claim 5, wherein the first user interface element comprises at least one of a popup window, a popover window, a dropdown list, a collapsible panel, or a dialog box, the first user interface element being rendered upon a selection of the presentation of the first item in the user interface.

13. The system of claim 5, wherein, when executed, the at least one application further causes the at least one computing device to at least:

receive a search query via the client device during a same interactive session with the electronic commerce marketplace;

generate a search results associated with the search query;

determine that a new item is available from at least a portion of the plurality of merchants;

adjust the predicted merchant preference in real time based at least in part on the first interaction and the second interaction; and select another subset of merchants from the at least a portion of the plurality of merchants based at least in part on the adjusted predicted merchant preference.

14. A method, comprising:

determining, via at least one computing device, an occurrence of a shopping session between a client and an electronic commerce system;

generating, via the at least one computing device, a first user interface element comprising a plurality of selectable components comprising individual selectable components corresponding to a respective merchant of a plurality of merchants offering a first item via the electronic commerce system;

inserting, via the at least one computing device, the first user interface element in a user interface associated with a presentation of the first item in the user interface;

transmitting, via the at least one computing device, the user interface comprising the first user interface element to the client;

detecting a first interaction performed by the client, the first interaction being associated with the first user interface element within the shopping session, the first interaction corresponding to a selection of a particular selectable component of the individual selectable components, the particular selectable component being associated with a first merchant of the plurality of merchants;

detecting a second interaction performed by the client within the shopping session, the second interaction corresponding to a selection of a second item offered by the first merchant;

determining that a third item within a shopping cart is available from the first merchant, but is currently being sold from a second merchant that is different from the first merchant;

ranking the plurality of merchants based upon the first interaction and second interaction; and generating a second user interface element with the ranked plurality of merchants in proximity to a presentation of the third item on a shopping cart user interface, wherein the second user interface element operates to allow a user to modify a provider of the third item from the second merchant to the first merchant or a third merchant and provide an incentive to modify the provider of the third item to the first merchant.

15. The method of claim 14, further comprising:

receiving, via the at least one computing device, a search query via the client;

generating, via the at least one computing device, search results associated with the search query; and selecting, via the at least one computing device, a subset of the search results based at least in part on a plurality of relevancy factors.

16. The method of claim 15, wherein the user interface comprises a search results user interface, and further comprising generating the search results user interface, the search results user interface including a ranked listing of the subset of the search results, and the first user interface element being inserted in proximity to the presentation of the first item in the ranked listing in the search results user interface.

17. The method of claim 15, wherein the multi-interactive session is determined based at least in part on the search query.

18. The method of claim 14, wherein the individual selectable components include a merchant name and at least one of: a minimum order threshold, an availability time, a density of relevant items available from a respective merchant, a price, a delivery speed, a number of items to include to reach the minimum order threshold, an available offer, an indication that the respective merchant has been predicted to be a preferred merchant, or a prior purchase history.

19. The method of claim 14, wherein the individual selectable components are positioned in a particular order based at least in part on at least one of: a prior action with a prior user interface element, a user-specific purchase history, a similar user purchase history, a merchant capacity, a membership status, an environmental condition, a client location, a merchant location, an item price, an open cart status, or an item type.

20. The method of claim 14, wherein the first and the second interactions comprise a hovering over at least one of the plurality of selectable components for a predefined amount of time, a failure to interact with any one of the plurality of selectable components, or a selection of another particular selectable component.

\* \* \* \* \*